(12) United States Patent
Freund et al.

(10) Patent No.: US 8,272,650 B2
(45) Date of Patent: Sep. 25, 2012

(54) LOW-END ADJUSTMENT MECHANISM FOR VEHICLE SUSPENSIONS

(75) Inventors: Wolfgang Freund, Langenbernsdorf (DE); Daniel Lezock, Thermalbad Wiesenbad (DE); Andreas Kissler, Crimmitschau (DE); Juergen Schulze, Chemnitz (DE)

(73) Assignee: asturia Automotive Systems AG, Munich (DE)

( * ) Notice: Subject to any disclaimer, the term of this patent is extended or adjusted under 35 U.S.C. 154(b) by 316 days.

(21) Appl. No.: 12/665,563
(22) PCT Filed: Jun. 16, 2008
(86) PCT No.: PCT/DE2008/001021
§ 371 (c)(1), (2), (4) Date: Dec. 21, 2009
(87) PCT Pub. No.: WO2008/154911
PCT Pub. Date: Dec. 24, 2008

(65) Prior Publication Data
US 2010/0187787 A1     Jul. 29, 2010

(30) Foreign Application Priority Data
Jun. 20, 2007  (DE) ............... 20 2007 008 749 U

(51) Int. Cl.
*B60G 17/00* (2006.01)
(52) U.S. Cl. ........... 280/124.106; 280/5.506; 280/5.508; 280/5.514; 280/6.159; 280/124.103; 464/139
(58) Field of Classification Search ........... 280/124.101, 280/124.103, 124.106, 124.414, 124.151, 280/124.162, 124.163, 124.166, 124.168, 280/124.177, 124.179, 5.502, 5.506–5.509, 280/5.514, 6.157, 6.159, 787; 464/68.3, 464/106, 137–139, 24; 74/25, 50, 55, 89, 74/574.2–574.4; 92/31, 33, 84
See application file for complete search history.

(56) References Cited

U.S. PATENT DOCUMENTS
3,156,161 A * 11/1964 Forsman et al. .................. 92/33
3,767,181 A   10/1973 Van der Burgt et al.
3,858,902 A   1/1975 Howells et al.
4,095,485 A * 6/1978 Hiersig ........................ 464/65.1
(Continued)

FOREIGN PATENT DOCUMENTS
CA       2500395 A1 * 4/2004
(Continued)

OTHER PUBLICATIONS

Race Bernard Claude, Dispositif De Commande De Rotation D'Une Fraction De Tour, Applicable Notamment a Un Robinet a Obturateur Rotatif, May 11, 1979, France, FR 2406247, English Abstract.*
Race Bernard Claude, Dispositif De Commande De Rotation D'Une Fraction De Tour, Applicable Notamment a Un Robinet a Obturateur Rotatif, May 11, 1979, France, FR 2406247, Machine translation of Description.*
Zwickau Sachsenring, System for compensating for rocking in vehicles comprises cylinders containing central pistons, one piston rod being attached to connecting rod and opposite side of piston being connected by ball-headed rods to cylinder end, Jul. 14, 2005, Germany, DE 20 2005 006 545 U1, English Abstract.*

(Continued)

*Primary Examiner* — Joseph Rocca
*Assistant Examiner* — James English
(74) *Attorney, Agent, or Firm* — Crowell & Moring LLP

(57) ABSTRACT

A low-end adjusting mechanism for vehicle suspensions useful for compensating rolling and pitching motions and for leveling purposes, in which a vehicle spring (1) having a longitudinal axis is mounted between two spring seats or receptacles (2, 3), and at least one spring seat can be adjusted in the direction of the longitudinal axis of the spring by rod shaped coupling elements which are mounted at both ends in an articulated or pivotable manner.

19 Claims, 2 Drawing Sheets

U.S. PATENT DOCUMENTS

Figure 1:
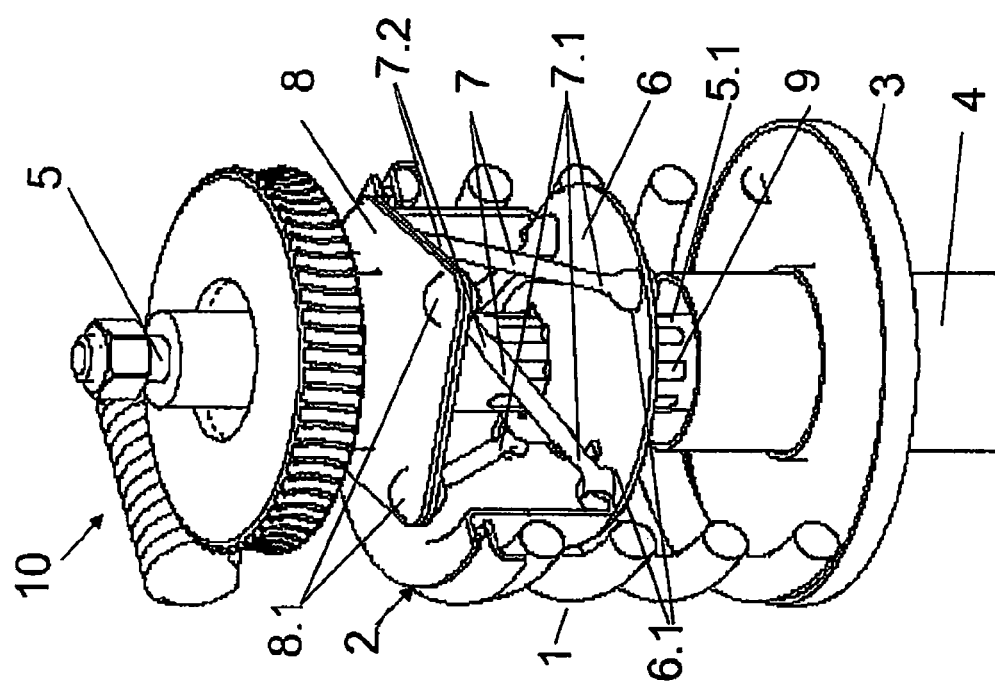

| | | | | |
|---|---|---|---|---|
| 4,133,215 | A | * | 1/1979 | Norris et al. ............. 74/89 |
| 4,548,091 | A | * | 10/1985 | Norton ............. 74/99 R |
| 4,555,008 | A | * | 11/1985 | Nagano ............. 192/208 |
| 5,899,112 | A | * | 5/1999 | Richter ............. 74/99 R |
| 5,935,007 | A | * | 8/1999 | Yang ............. 464/24 |
| 6,047,804 | A | * | 4/2000 | Feldhaus et al. ............. 192/70.17 |
| 7,845,660 | B2 | * | 12/2010 | van der Knaap ....... 280/124.106 |
| 7,992,485 | B2 | * | 8/2011 | Lezock et al. ............. 92/31 |
| 2004/0036206 | A1 | | 2/2004 | Loser et al. |
| 2006/0163863 | A1 | | 7/2006 | Ellmann et al. |
| 2010/0082165 | A1 | * | 4/2010 | Freund et al. ............. 700/280 |
| 2011/0130208 | A1 | * | 6/2011 | Freund et al. ............. 464/24 |
| 2011/0190090 | A1 | * | 8/2011 | Freund et al. ............. 475/162 |

FOREIGN PATENT DOCUMENTS

| | | | |
|---|---|---|---|
| DE | 37 18 390 A1 | | 12/1987 |
| DE | 4001143 C1 | * | 2/1991 |
| DE | 197 55 656 C1 | | 8/1999 |
| DE | 101 44 111 A1 | | 3/2003 |
| DE | 102 55 764 B3 | | 2/2004 |
| DE | 102 45 457 B3 | | 3/2004 |
| DE | 101 01 694 C5 | | 5/2005 |
| DE | 20 2005 006545 U1 | | 7/2005 |
| DE | 202005006545 U1 | * | 8/2005 |
| DE | 10 2005 059147 | | 12/2006 |
| DE | 10 2006 056 632 A1 | | 3/2007 |
| EP | 1 627 756 A | | 2/2006 |
| FR | 2406247 A | * | 6/1979 |
| JP | 07 139519 A | | 5/1995 |

OTHER PUBLICATIONS

Zwickau Sachsenring, System for compensating for rocking in vehicles comprises cylinders containing central pistons, one piston rod being attached to connecting rod and opposite side of piston being connected by ball-headed rods to cylinder end, Jul. 14, 2005, Germany, DE 20 2005 006 545 U1, Machine translation of Description.*

Wolfgang Moedinger, Independent suspension on vehicle—has spring bearing on lower link and damper connected to upper link, Feb. 7, 1991, Germany, DE 40 01 143 C1, English Abstract.*

Wolfgang Moedinger, Independent suspension on vehicle—has spring bearing on lower link and damper connected to upper link, Feb. 7, 1991, Germany, DE 40 01 143 C1, Machine Translation of Description.*

International Search Report together with the Written Opinion of the International Searching Authority (with English translation of Search Report), Fourteen (14) pages, Nov. 3, 2008.

\* cited by examiner

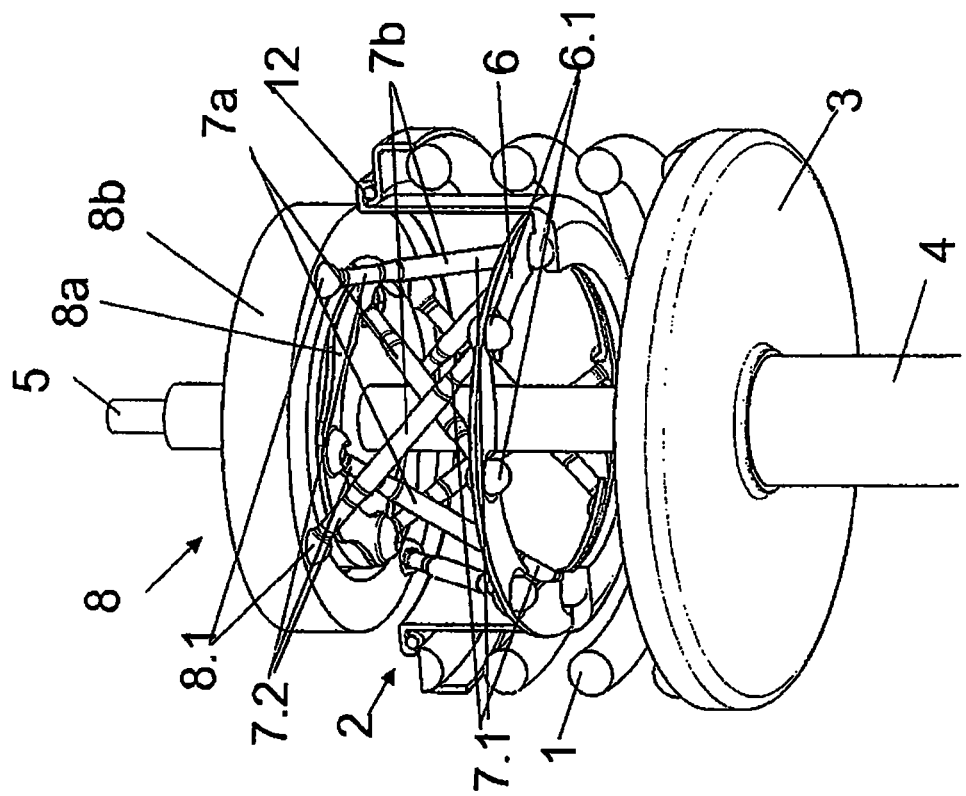
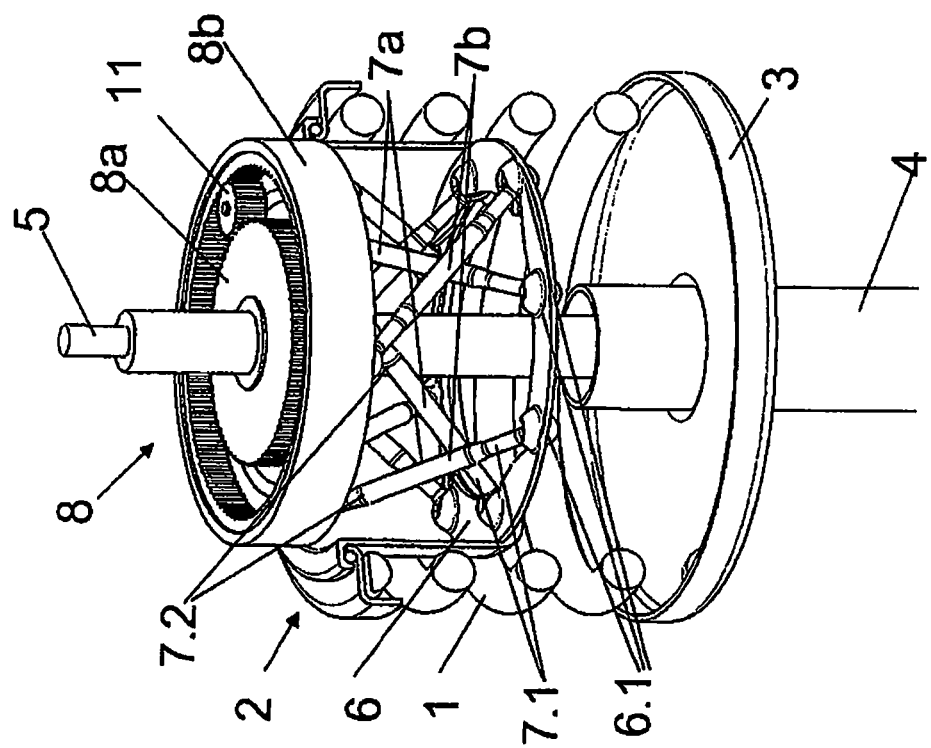

LOW-END ADJUSTMENT MECHANISM FOR VEHICLE SUSPENSIONS

The invention relates to a low-end adjustment mechanism for vehicle suspensions and is used in particular for compensating rolling and pitching movements and for leveling.

A vehicle spring, which has a spring support for support of a coiled spring stretched between two spring parts and a vibration damper, which comprises a damper tube and a piston rod attached to the vehicle, is known from DE 101 01 694 C5. A part of the piston rod and/or the damper tube is situated inside the coiled spring and at least one spring plate is axially adjustable using a drive unit having electric motor and transmission. The electric motor is implemented as a ring motor having an external stator and an internal rotor. The rotor carries a movement nut on its interior, which axially adjusts a spring plate support, which is externally implemented as a threaded spindle and is connected to the spring plate. The spring plate support has a base provided with a central opening, against which the spring plate is supported. An electromechanical apparatus for the position adjustment of the vehicle structure is thus provided, because an automatic height adjustment can be implemented on each spring strut and the vehicle is moved in the horizontal (horizontally oriented) when cornering, braking, and/or accelerating.

A vehicle chassis having a spring support for supporting a coiled spring, which is stretched between two spring plates, and a vibration damper is described in DE 102 55 764 B3. An area of the piston rod and/or the damper tube is also situated inside the coiled spring here. At least one spring plate is axially adjustable using a drive unit in the form of a transmission, which is formed from a ring electric motor and a threaded spindle and threaded screw. At least a part of the threaded spindle is provided radially inside the coiled spring, on the one hand, and radially in the area of the radial extension of the ring electric motor, on the other hand.

A further solution for spring low-end displacement is known from DE 10 2006 056 632 A1. According to this solution, the support points of the support springs and the ends of the lateral stabilizer are individually adjustable. The support points of the support springs are individually adjusted using actuators. However, the design implementation of the actuators cannot be inferred from this publication.

The known systems have a complicated construction with dimensions which are too large and do not have self-locking in the adjusted state.

The object of the invention is to develop a low-end adjustment mechanism for vehicle suspensions, which can be used in particular for compensating rolling and pitching movements and for leveling, has a simple construction with little installation space, operates functionally reliably and energy efficiently with self-locking in the adjusted state, and keeps the required torque constant or reduces it in the event of a height adjustment using increasing spring force.

This object is achieved by the characterizing features of the first claim, and advantageous embodiments result from the subclaims.

In the low-end adjustment mechanism for vehicle suspensions according to the invention, a vehicle spring, which has a spring longitudinal axis, is fastened between two spring receptacles, at least one spring receptacle being adjustable in the direction of the spring longitudinal axis via bar-shaped coupling elements which are articulated at both ends.

The bar-shaped coupling elements assume a spatial angle and are operationally linked at their first end to the spring receptacle via a first fastener and are mounted at their second end on a second fastener so that the spring receptacle is adjustable in the direction of the longitudinal axis of the spring via a relative rotation between first and second fasteners.

The rotational movement can be initiated using a worm drive, for example.

The first or second fastener is preferably mounted so it is axially displaceable and rotationally fixed and the particular other fastener is mounted so it is axially fixed and rotatable.

In addition to the above-mentioned embodiment, it is possible that the first fastener is implemented in two parts in the form of an inner element and an outer element. In this case, a first set of coupling elements is mounted at the first end of the coupling elements on the inner element and a second set of coupling elements is mounted at the first end on the outer element. The second ends of the first and second sets of the coupling elements are situated on the second fastener on identical or different pitch circles.

Alternatively, the second fastener can also be implemented in two parts in the form of an inner element and an outer element, the coupling elements being fastened similarly.

In both cases, the outer and inner elements are rotatable relative to one another and one fastener is mounted so it is axially movable and rotationally movable and the other fastener is axially fixed. In this way, the fastener opposite to the two-part fastener executes a stroke movement in the direction of the spring longitudinal axis upon relative rotation between outer and inner elements.

The ends of the first set of the coupling elements opposite to the inner element are preferably situated on a smaller pitch circle than the ends of the second set of the coupling elements opposite to the outer element.

In particular, the inner element and the outer element form centrically situated rings, the inner element and the outer element preferably being pivotable to one another using a worm drive.

For example, the inner element and the outer element may be pivoted relative to one another using a gearwheel situated between them, which engages in outer teeth of the inner ring and inner teeth of the outer ring.

This gearwheel can in turn be drivable using a worm gear in particular.

The coupling elements are advantageously mounted at both ends on the first and second fasteners like ball and socket joints.

The spring receptacle is preferably implemented in the form of a bowl-like spring plate. The coupling elements are situated at least partially in the inner chamber of the spring. The spring is particularly a coiled spring.

A completely novel generation of electromechanical spring low-end adjustment mechanisms is provided by the invention. The low-end adjustment is performed for the first time via coupling elements articulated at both ends, a fastener connected to the low-end receptacle (the spring plate) of the spring being used for transmitting the reaction forces, which are introduced via the other fastener and the coupling elements.

A smaller, lighter, more agile, and more robust construction of a vehicle suspension is possible and a reliable mode of operation is ensured.

The coupling elements fastened on the first and second fasteners change their spatial angle upon a relative rotational movement between first and second fasteners, whereby a stroke movement is generated and the low end of the spring is adjusted. It is thus possible, inter alia, to change the spring force.

The reaction and switching times are also improved in comparison to typical systems using the novel solution. Rolling and pitching movements (chassis movements) of a vehicle occurring during travel are compensated for rapidly and efficiently through the novel adjustment capability of each spring strut. Furthermore, the chassis position of the vehicle is adjustable, for example, if the vehicle is strongly loaded. The chassis of the vehicle can thus be kept in a desired position independently of the load by the spring low-end adjustment mechanism.

The invention is explained in greater detail hereafter on the basis of exemplary embodiments and associated drawings. In the figures:

FIG. 1: shows a low-end adjustment mechanism for vehicles, the first fastener being mounted so it is axially displaceable and rotationally fixed and being coupled to the bowl-shaped spring plate of a coiled spring and the second fastener being drivable via a worm drive, coupling elements being situated between the first and second fasteners, FIGS. 2a and 2b: show a low-end adjustment mechanism for vehicles, the first fastener being mounted so it is axially displaceable and rotationally fixed and being coupled to the bowl-shaped spring plate of a coiled spring and the second fastener having an inner element and an outer element and two sets of coupling elements being provided, which are each mounted at the first end in the first fastener, the first set of coupling elements being mounted at their second end on the inner element and the second set of coupling elements being mounted at their second end on the outer element of the second fastener like a ball and socket joint.

A low-end adjustment mechanism of the spring 1 of a vehicle suspension is shown in FIG. 1. A spring 1 in the form of a coiled spring is provided. The coiled spring is supported at each end on a spring plate 2, 3. A shock absorber 4 having a piston rod 5 is seated centrally inside the spring 1 (coiled spring). The shock absorber 4 is fastened at its other end (not shown) on the wheel suspension. The first fastener 6 is mounted so it is axially displaceable and rotationally fixed and is coupled to the bowl-shaped spring plate 2 of the spring 1 (coiled spring) and the second fastener 8 is drivable via a worm drive 10, coupling elements 7 being situated between the first and second fasteners 6, 8. The upper spring plate 2 is implemented as bowl-shaped. The fastener 6 forms the floor of the bowl. Mounts 6.1 for the first spherical ends 7.1 of the coupling elements 7 are provided in the first fastener 6. The second spherical ends 7.2 of the coupling elements 7 are mounted like ball and socket joints in the second fastener 8 in mounts 8.1. The coupling elements 7 assume a spatial angle.

The first fastener 6 is mounted so it is axially movable and rotationally fixed on a guide element 5.1, which encloses the piston rod 5, using longitudinal teeth 9. The second fastener 8 is mounted so it is rotatable and axially fixed via a worm gear 10.

If a rotational movement of the second fastener 8 is generated using the worm gear 10, the spatial angle (angle of inclination α) of the coupling elements 7 is changed and a stroke movement of the first fastener 6 and thus the upper spring plate 2 is caused by the longitudinal teeth 9. As the angle of inclination α of the coupling elements 7 becomes smaller, a stroke movement of the spring plate 2 upward is executed. As the angle of inclination α of the coupling elements 7 becomes larger, the spring plate 2 moves downward.

It is advantageous that the required rotational force decreases with increasing spring force.

In the exemplary embodiment according to FIG. 1, 4 coupling rods are provided. Depending on the application, fewer (at least one) or more coupling elements may be used.

A low-end adjustment mechanism for vehicles is shown in a three-dimensional view from above in FIG. 2a and in a three-dimensional view from below in FIG. 2b, in contrast to FIG. 1, the first fastener 6 being mounted so it is axially displaceable and rotatable. The first fastener 6 is coupled to the bowl-shaped spring plate 2, which lies on top here, of the spring 1 (coiled spring), as in FIG. 1. The second fastener 8 also has an inner element 8a and an outer element 8b, in contrast to FIG. 1. The two elements 8a, 8b are fastened concentrically and axially fixed and rotationally movable on the piston rod 5 of the piston 5. Two sets of coupling elements 7a and 7b are provided, which are each mounted at their first end 7.1 on the first fastener 6. The first set of coupling elements 7a is mounted using the second ends 7.2 of the coupling elements 7a on the inner element 8a and the second set of coupling elements 7b is mounted using the second ends 7.2 of the coupling elements 7b on the outer element 8b of the second fastener 8, like ball and socket joints. The inner element 8a and the outer element 8b of the second fastener 8 are pivotable to one another using a gearwheel 11 situated between them. The gearwheel 11 engages in outer teeth (not shown in greater detail) of the inner ring (inner element 8a) and inner teeth of the outer ring (outer element 8b) for this purpose. The gearwheel 11 can be driven via a worm gear (not shown), for example.

The coupling elements 7a of the first set have an opposing inclination direction to the coupling elements 7b of the second set. If the inner element 8a and the outer element 8b are pivoted to one another using the gearwheel 11, the angle of inclination of the coupling elements 7a, 7b decreases or increases. In the reaction force is transmitted to the first fastener 6 and thus to the spring plate 2, whereby the spring plate executes a stroke movement and a rotational movement. A ball bearing 12 is therefore provided between the spring plate 2 and the spring 1. Four coupling elements 7a, 7b, which are each situated alternately, are used in each set in this embodiment. Fewer or more coupling elements may also be used.

Only half the torque is required using the embodiment according to FIG. 2 in comparison to the embodiment variant according to FIG. 1.

The piston rod 5 and the second fastener 8 are situated fixed on the chassis both in the embodiment according to FIG. 1 and also in the embodiment according to FIGS. 2a/2b, however, the rotational mobility of the second fastener 8 being ensured. The lower spring plate 3 is fastened on the damper tube (not shown in greater detail) of the shock absorber 4.

The invention claimed is:

1. A low-end adjustment mechanism for a vehicle suspension, said mechanism comprising a vehicle spring having a spring longitudinal axis, wherein:

said vehicle spring is secured between first and second spring receptacles, at least the first spring receptacle is adjustable in the direction of the spring longitudinal axis via bar-shaped coupling elements which are pivotably mounted at both ends, the bar-shaped coupling elements assume a spatial angle and are each operationally linked at a first end to the second spring receptacle via a first fastener and mounted at a second end on a second fastener, and the first spring receptacle is adjustable in the direction of the longitudinal axis of the spring by a relative rotation between first and second fasteners.

2. The low-end adjustment mechanism according to claim 1, wherein the relative rotation is effected using a worm drive.

3. The low-end adjustment mechanism according to claim 1, wherein one of the first and second fasteners is mounted so it is axially displaceable and rotationally fixed, and the other of the first and second fasteners is mounted so it is axially fixed and rotatable.

4. The low-end adjustment mechanism according to claim 1, wherein the first fastener is constructed in two parts and comprises an inner element and an outer element; the respective first ends of a first set of coupling elements are mounted on the inner element; the respective first ends of a second set of coupling elements are mounted on the outer element, and the second ends of the first and second sets of coupling elements are arranged on the second fastener on identical or different pitch circles.

5. The low-end adjustment mechanism according to claim 4, wherein the outer element and the inner element are rotatable relative to each other; and wherein one fastener is mounted so as to be moveable both axially and rotationally, and the other fastener is axially fixed, so that upon relative rotation of the inner and outer elements, the fastener opposite the two-part fastener executes a stroke movement in the direction of the spring longitudinal axis.

6. The low-end adjustment mechanism according to claim 4, wherein the ends of the first set of coupling elements disposed opposite the inner element are situated on a smaller pitch circle than the ends of the second set of the coupling elements which are disposed opposite the outer element.

7. The low-end adjustment mechanism according to claim 4, wherein the inner element and the outer element form centric rings.

8. The low-end adjustment mechanism according to claim 4, wherein the inner element and the outer element are pivotable in relation to one another by a worm drive.

9. The low-end adjustment mechanism according to claim 4, wherein the inner element and the outer element comprise rings which are pivotable in relation to one another using a pinion gear situated between inner and outer elements which engages in outer teeth of the inner ring and inner teeth of the outer ring.

10. The low-end adjustment mechanism according to claim 9, wherein the pinion gear is drivable using a worm gear.

11. The low-end adjustment mechanism according to claim 1, wherein the second fastener is constructed in two parts and comprises an inner element and an outer element; the respective second ends of a first set of coupling elements are mounted on the inner element; the respective second ends of a second set of coupling elements are mounted on the outer element, and the first ends of the first and second sets of coupling elements are arranged on the first fastener on identical or different pitch circles.

12. The low-end adjustment mechanism according to claim 11, wherein the outer element and the inner element are rotatable relative to each other; and wherein one fastener is mounted so as to be moveable both axially and rotationally, and the other fastener is axially fixed, so that upon relative rotation of the inner and outer elements, the fastener opposite the two-part fastener executes a stroke movement in the direction of the spring longitudinal axis.

13. The low-end adjustment mechanism according to claim 11, wherein the ends of the first set of coupling elements disposed opposite the inner element are situated on a smaller pitch circle than the ends of the second set of the coupling elements which are disposed opposite the outer element.

14. The low-end adjustment mechanism according to claim 11, wherein the inner element and the outer element form centric rings.

15. The low-end adjustment mechanism according to claim 11, wherein the inner element and the outer element are pivotable in relation to one another by a worm drive.

16. The low-end adjustment mechanism according to claim 11, wherein the inner element and the outer element comprise concentric rings which are pivotable in relation to one another using a pinion gear situated between inner and outer elements which engages in outer teeth of the inner ring and inner teeth of the outer ring.

17. The low-end adjustment mechanism according to claim 1, wherein the coupling elements are mounted at both ends by ball and socket joints.

18. The low-end adjustment mechanism according to claim 1, wherein the second spring receptacle is constructed in the form of a bowl-like spring plate, and the coupling elements are at least partially situated interiorly of the spring.

19. The low-end adjustment mechanism according to claim 1, wherein the spring is a coil spring.

* * * * *